United States Patent [19]
Dupuy

[11] Patent Number: 5,924,034
[45] Date of Patent: Jul. 13, 1999

[54] CELLULAR MOBILE RADIO SYSTEM AND BASE TRANSCEIVER STATION AND BASE STATION CONTROLLER THEREFOR

[75] Inventor: Pierre Dupuy, Paris, France

[73] Assignee: Alcatel CIT, Paris, France

[21] Appl. No.: 08/719,464

[22] Filed: Sep. 25, 1996

[30] Foreign Application Priority Data

Sep. 26, 1995 [FR] France ..................... 9511265

[51] Int. Cl.$^6$ .............. H04Q 7/38; H04Q 7/22
[52] U.S. Cl. .......... 455/440; 455/446; 455/456
[58] Field of Search .............. 455/436, 437, 455/439, 440, 446, 456

[56] References Cited

U.S. PATENT DOCUMENTS

| | | | |
|---|---|---|---|
| 4,723,266 | 2/1988 | Perry .................... | 455/446 |
| 5,260,943 | 11/1993 | Comroe et al. .......... | 455/440 |
| 5,327,575 | 7/1994 | Menich et al. ........... | 455/437 |
| 5,390,339 | 2/1995 | Bruckert et al. ......... | 455/440 |
| 5,394,158 | 2/1995 | Chia ...................... | 455/440 |
| 5,422,813 | 6/1995 | Schuchman et al. ..... | 455/440 |
| 5,551,059 | 8/1996 | Hutcheson et al. ...... | 455/440 |

FOREIGN PATENT DOCUMENTS

WO 9312589  6/1993  WIPO.

OTHER PUBLICATIONS

Halamek et al., "Zellgrenzdetektion mit relativer Entfernungsmessung in Netz C", Funk–Technik, vol. 41, No. 4 Apr. 1986, Heidelberg DE.

*Primary Examiner*—Willis R. Wolfe
*Attorney, Agent, or Firm*—Sughrue, Mion, Zinn, Macpeak & Seas, PLLC

[57] ABSTRACT

A cellular mobile radio system selects the best cell to be accessed for a given position of a mobile station by determining the distance of the mobile station relative to the base transceiver station of a cell with which it is communicating by measuring the propagation time between the mobile station and the base transceiver station, resolving the indeterminacy associated with the direction in which said mobile station is located relative to said base transceiver station, and then determining which cell the mobile station is situated in the coverage area of, this cell constituting the best cell. The resolving of the indeterminacy is rendered independent of the synchronized or non-synchronized state of the system.

12 Claims, 2 Drawing Sheets

CELLULAR MOBILE RADIO SYSTEM AND BASE TRANSCEIVER STATION AND BASE STATION CONTROLLER THEREFOR

BACKGROUND OF THE INVENTION

1. Field of the Invention

The present invention concerns cellular mobile radio systems.

The present invention is more particularly, although not exclusively, concerned with cellular mobile radio systems in which access by a mobile station to a cell is effected by means of a particular frequency specific to that cell, called the control frequency, on which synchronization information enabling the mobile station to synchronize to the base transceiver station of that cell is broadcast and on which information enabling a mobile station to access the system in order to set up a call is exchanged.

The control frequencies are generally transmitted continuously to enable the mobile stations listening to them to carry out measurements in order to select the best cell to access at any time.

In systems using the frequency hopping technique (which, among other things, improves transmission quality in the presence of fading), there is generally provision for separate and continuous transmission of the control frequency.

This represents a penalty in terms of spectral efficiency.

2. Description of the Prior Art

Document U.S. Pat. No. 4,723,266 or document WO 93/12589 describes a cellular mobile radio system made up of two types of cell (e.g. microcells and umbrella cells) of which one type is dependent on the other, from the point of view of their radio coverage, and has no control frequency. In this system, access by a mobile station to a cell with no control frequency is effected via a cell with a control frequency, a change of cell (or "handover") then being performed to the cell with no control frequency.

In a system of this kind the problem arises of selecting the best cell to access for a given position of the mobile station, since it is not possible to listen to the control frequencies in the case of cells with no control frequency.

In the documents mentioned above, this problem is solved by providing in each cell, whether communicating with a mobile station or not, specific means for listening to the mobile station enabling the system to determine the best cell by comparison of the various measurement results obtained in this way. This has the disadvantage of requiring, in the cells with no control frequency, dedicated equipment in addition to the equipment needed to handle wanted information.

One object of the present invention is to avoid this drawback.

However, the present invention also applies to cellular mobile radio systems in which all cells have a control frequency.

In such systems, and as described in document FUNKTECHNIK, vol. 41, n°4, April 1986, HEIDELBERG DE, pages 146–149, XP002006000, HALAMEK ET AL: "Zellgrenzdetektion mit relativer Entfernungsmessung in Netz C", cell selection can be effected by determining the position of a mobile station by measuring the propagation time difference between the mobile station and two base transceiver stations. To be more precise, a base transceiver station BSa with which the mobile station is communicating measures the propagation time Ta between that base transceiver station and the mobile station and transmits that propagation time to the mobile station which then retransmits it, in which case the propagation time is received by another base transceiver station BSb (which can then, assuming that the system is synchronized), i.e. that the base transceiver stations are synchronized, determine the propagation time Tb between the mobile S station and the base transceiver station BSb and thus determine the difference between the propagations Ta and Tb. One disadvantage of a solution of this kind is therefore that it works only in the case of a synchronized system.

One object of the present invention is to avoid this drawback.

SUMMARY OF THE INVENTION

Accordingly, the present invention consists in a cellular mobile radio system including means for selecting the best cell to be accessed for a given position of a mobile station, said means including:

first means for determining the distance of the mobile station relative to the base transceiver station of a cell with which it is communicating by measuring the propagation time between the mobile station and the base transceiver station, second means for resolving the indeterminacy associated with the direction in which said mobile station is located relative to said base transceiver station, and third means for determining, from results provided by said first and second means, which cell the mobile station is situated in the coverage area of, this cell constituting said best cell, wherein said second means include means whereby said resolving of said indeterminacy is rendered independent of the synchronized or non-synchronized state of said system.

Said second means include, in the case of a mobile station communicating with a cell at the time of a system access request:

means for commanding a change of cell to another cell, and means for determining the distance of the mobile station relative to the base transceiver station of said other cell by measuring the propagation time between said mobile station and said other cell.

In this way, resolving indeterminacy is made independent of the synchronized or non-synchronized state of the base transceiver stations by virtue of the fact that, after measuring the propagation time of the mobile station relative to one base transceiver station, a change of cell (or "handover") to another cell is commanded in order to measure the propagation time between the mobile station and this other base transceiver station, this latter propagation time measurement then being not a relative measurement, relative to the first base transceiver station, as in the document mentioned above, but instead an absolute measurement and therefore independent of the synchronized or non-synchronized state of the base transceiver stations.

Said second means include, in the case of a mobile station communicating with said system at the time of a call already set up, means for measuring the power received by said mobile station on one or more control frequencies.

This makes the resolution of indeterminacy independent of the synchronized or non-synchronized state of the system by virtue of the fact that, after measuring the propagation time of the mobile station relative to one base transceiver station a receive power measurement is carried out rather than another propagation time measurement.

Said second means include, in the case of a mobile station communicating with a cell at the time of a call already set up, means for measuring the power received from the mobile station by the base transceiver station of said cell via antennas having separate radio coverage areas.

In the same way, this makes resolving the indeterminacy independent of the synchronized or non-synchronized state of the system by virtue of the fact that, after measuring the propagation time of the mobile station relative to one base station, a receive power measurement is carried out instead of another propagation time measurement.

Other objects and features of the present invention will emerge from a reading of the following description of embodiments of the invention given with reference to the accompanying drawings.

DETAILED DESCRIPTION OF THE PREFERRED EMBODIMENTS

Figure 1:
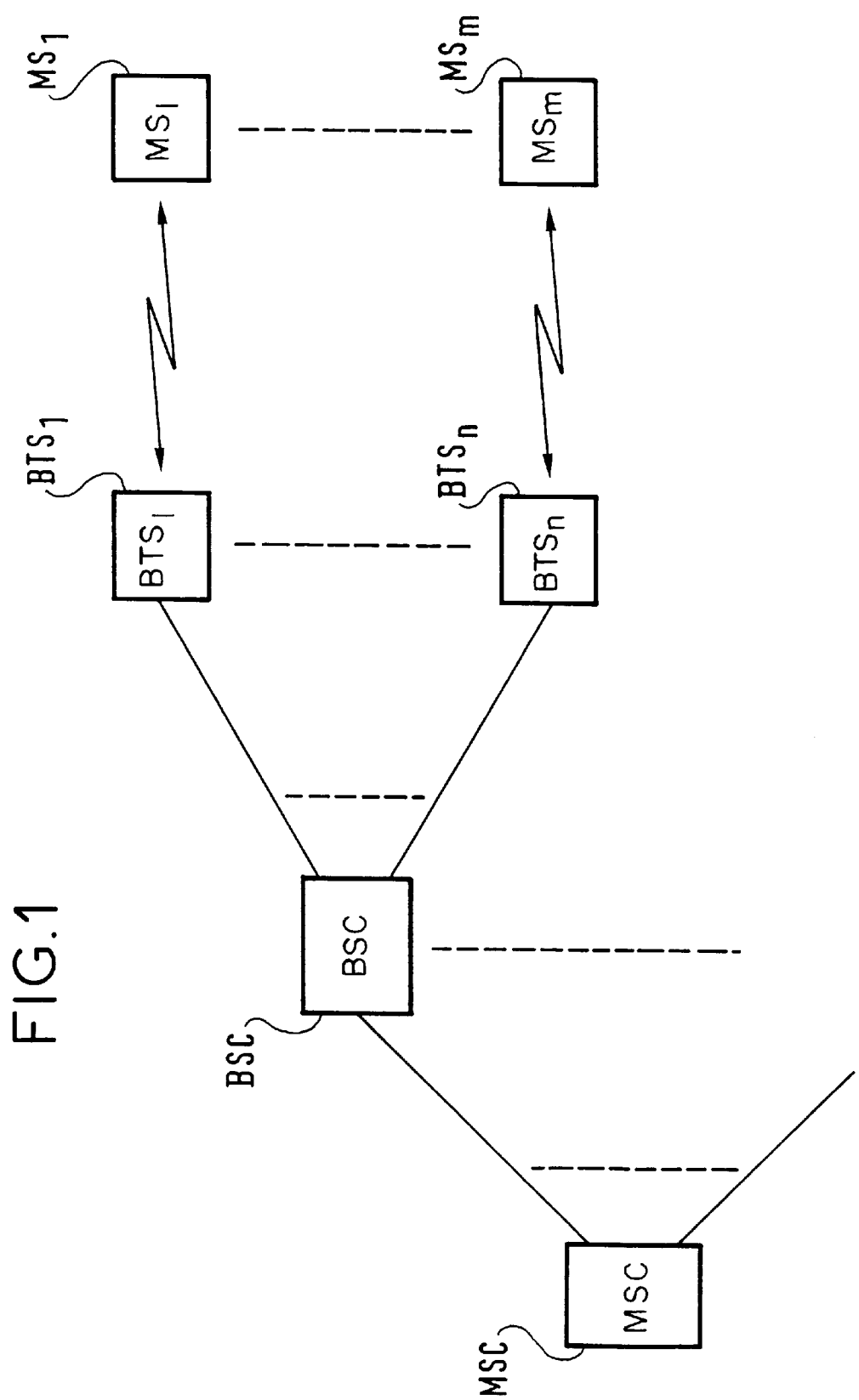
FIG. 1 summarizes the general architecture of a cellular mobile radio system such as the GSM system, for example.

FIG. 1 shows the general architecture of a cellular mobile radio system such as the GSM system, for example.

Each cell is equipped with a base transceiver station $BTS_1$ through $BTS_n$.

Each base transceiver station can be connected by a radio link to a mobile station $MS_1$ through $MS_m$ to communicate with that mobile station.

A set of base transceiver stations $BTS_1$ through $BTS_n$ is connected by cable links to a base station controller BSC and a set of base station controllers BSC is connected to a mobile services switching center MSC, the combination of the MSC and BSC handling call management, including management of the associated signalling.

Figure 2:
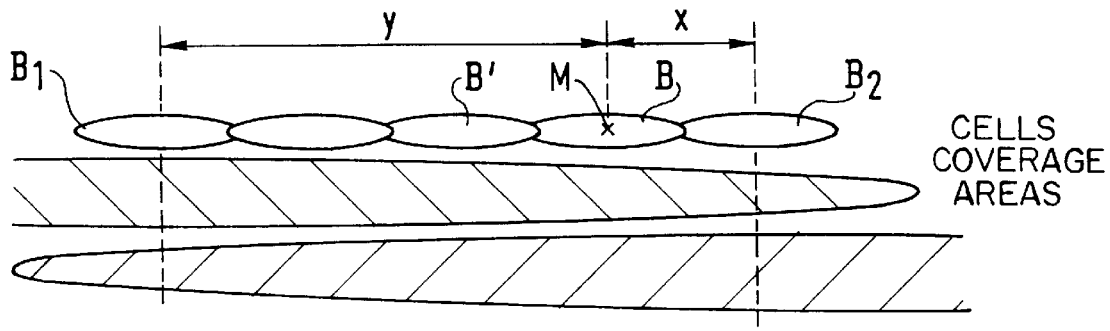
FIG. 2 shows one example of a cellular mobile radio system to which the present invention can be applied.

FIG. 2 is a diagrammatic representation of one example of a cellular mobile radio network to which the present invention can be applied.

The cellular network shown in FIG. 2 is a linear microcellular network made of elongate microcells placed end-to-end. A network of this kind is typically used in an urban area to provide coverage in a street and, although this is not shown, it is readily conceivable that other networks of the same type could be superposed on this network, for example networks covering parallel and perpendicular streets.

In the example shown, only the end cells $B_1$ and $B_2$ have a control frequency and access by a mobile station M to a cell B having no control frequency is effected via a cell having a control frequency received by the mobile station M.

FIG. 2 shows by cross-hatching in a first direction the coverage area of the control frequency of the lefthand cell $B_1$ and by cross-hatching in a second direction the coverage area of the control frequency of the righthand cell $B_2$, these coverage areas being in fact superposed on a common horizontal axis. Note that regardless of the position of the mobile station between the first and last cells $B_1$ and $B_2$, it is capable of receiving the control frequency of these cells due to the low damping associated with direct line of sight transmission, i.e. the elongate shape of these cells.

In accordance with the invention, to select the best cell to access for a given position of the mobile station, the distance from the mobile station to the base transceiver station of a cell with which the mobile station is communicating is determined, after which the indeterminacy as to the direction in which the mobile station is located relative to that base transceiver station is resolved, to deduce the position of the mobile station and therefore the best cell, i.e. the cell in the coverage of which the mobile station is located.

A first embodiment of the invention will now be described, corresponding to the situation in which the mobile is communicating with a cell at the time of the mobile station requesting access to the network, this cell being therefore one with a control frequency.

When a mobile station M is operating but not communicating, it carries out power measurements continuously to determine the cell from which it receives the strongest control frequency, for example the cell $B_2$ in FIG. 2, and it pre-synchronizes to that cell using synchronization information broadcast on that frequency.

When the mobile station requires to access the network to make a call it transmits network access request information (on the control frequency in a particular channel, such as the random access channel (RACH) in the GSM system, for example).

The base transceiver station that receives the network access request information communicates with the BSC and MSC of the system to determine the response to be given to the mobile station and determines its distance from the mobile station, in order to determine the cell in whose coverage area the mobile station is located. This determination of the distance is based, for example, on a propagation time measurement as used in a time-division multiple access type system (such as the GSM system, for example) to determine the timing advance for the mobile station concerned.

When the distance "x" from the mobile station M to the base transceiver station $BTS_2$ of the cell $B_2$ has been determined, and if this distance "x" shows that the mobile station is not in the coverage area of the cell $B_2$, which is the situation shown in FIG. 2, a change of cell (or "handover") is performed to the cell $B_1$ that also has a control frequency received by the mobile station.

Note that if the mobile station M were not between the cells $B_1$ and $B_2$, as in the situation shown in FIG. 2, and in the situation previously referred to of a plurality of superposed linear networks designed to provide coverage of parallel or perpendicular streets, for example, a change of cell would be effected, not to the cell $B_1$, but to some other cell also having a control frequency received by the mobile station (if the mobile station is receiving more than one control frequency, that received at the highest power level could be chosen).

In this example where the change of cell is to the cell $B_1$, information relating to the procedure for access to the network by the mobile station M then continues to be exchanged between the mobile station M and the base transceiver station $BTS_1$ of the cell $B_1$.

On the basis of information transmitted by the mobile station M (on a slow associated control channel (SACCH) in this instance), the base transceiver station $BTS_1$ measures its distance "y" from the mobile station M in order to determine, by combination with the distance "x" determined previously, the cell with no control frequency in the coverage area of which the mobile station is located. In this example, this determination of the distance "y" resolves the indeterminacy associated with the direction of the mobile station relative to the base transceiver station of the cell $B_2$. The distance "y" is also determined on the basis of a propagation time measurement, for example.

The distances "x" and "y" obtained in this way are transmitted to the BSC or the MSC, for example to the base station controller BSC for the cells $B_1$ and $B_2$, where they are combined to deduce the position of the mobile station M between the cells $B_1$ and $B_2$, and thus to deduce therefrom which cell B with no control frequency in whose coverage area the mobile station M is located.

Note that in a system like the GSM system, for example, in which distance measurements are already transmitted to the base station controller BSC for the cells $B_1$ and $B_2$ (in this instance to enable, with other parameters, a decision to be taken on a future change of cell (or "handover")) there is then required in the base station controller only means for deducing the cell B from the distances "x" and "y". These means can be very simple, for example a table of correspondences.

Figure 3:
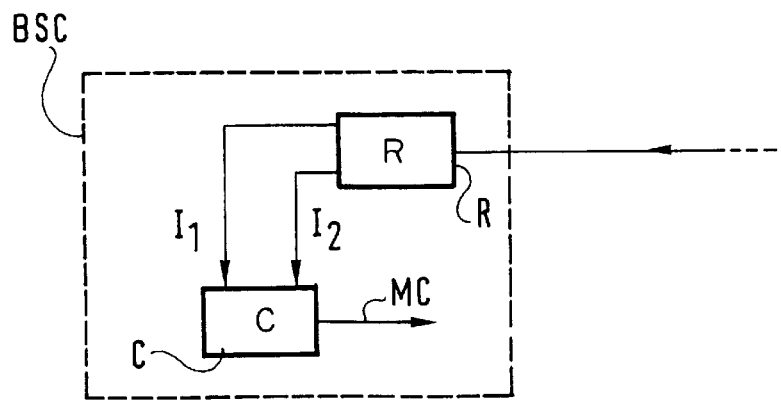
FIG. 3 shows one embodiment of means of the invention for resolving the indeterminacy associated with the direction of a mobile station.

FIG. 3 shows a base station controller device consisting of a base station controller BSC, for example, but which could equally well be a mobile services switching center MSC, including means R for receiving information from the associated base transceiver stations and, on the output side of the latter, means C for combining information $I_1$ representing the distance "x" and information $I_2$ representing the distance "y" and for deducing therefrom the best cell MC.

When the cell B has been determined, a new change of cell ("handover") is effected, in this instance from the cell $B_1$ to the cell $B_2$, but with a frequency (or a set of frequencies in the case of a system using frequency hopping) that corresponding to the cell B, this frequency or set of frequencies being determined as if it were a frequency (or set of frequencies) specific to the cell $B_2$ by the BSC, MSC.

Note that in a system like the GSM system, for example, a new change of cell, in this instance from $B_1$ to $B_2$, is effected rather than a subsequent channel assignment in the cell $B_1$, to break with the timing advance used in the cell $B_1$ and that does not correspond to the timing advance to be used in the cell B, it being possible to determine this latter timing advance in a manner that is known in itself, in particular by means of a presynchronized handover.

A second embodiment is now described, corresponding to the situation in which the mobile station is communicating with a cell on the occasion of a call already set up involving that mobile station, this cell being referred to here as the preceding cell, as opposed to the detected future best cell, called the new cell.

In a system like the GSM system, for example, in which the distance between the mobile station and the base transceiver station of the preceding cell is determined continuously during a call (in order to determine continuously the timing advance applied to the mobile station) and in which the distance continuously determined in this way is transmitted to the base station controller for the cell in question, the base station controller is able to detect an increase in this distance corresponding to the mobile station leaving the preceding cell.

In this case, and in the present example, the base station controller combines this measured distance with the result of measurement of the power received by the mobile station at one or more control frequencies, these power measurements being also transmitted to the base station controller, the combination being effected in order to determine the position of the mobile station and to deduce from this the cell, or new cell, in the coverage area of which the mobile station is now located.

For example, if it is detected that the mobile station has left the preceding cell, for example the cell B, and that the power received by the mobile station on the control frequency $f_{B1}$ of the cell $B_1$ is higher than that received by the mobile station on the control frequency $f_{B2}$ of the cell $B_2$, it is deduced that the mobile station is now in the coverage area of the cell B' (FIG. 2).

In a variant embodiment, if it is detected that the mobile station has left the coverage area of the preceding cell, for example the cell B, and that the power received by the mobile station on the control frequency $f_{B1}$ is increasing (or that the power received by the mobile station on the control frequency $f_{B2}$ is decreasing) it is deduced that the mobile station is now in the coverage area of the cell B' (FIG. 2, for example).

The power measurements received by the mobile station on one of the two control frequencies $f_{B1}$ and $f_{B2}$ is then used to resolve the indeterminacy as to the direction in which the mobile station is located relative to the base transceiver station of the cell B.

Note that in a system like the GSM system, for example, in which these power measurements are transmitted by the mobile station to the base transceiver station of the cell with which it is communicating on a slow associated control channel (SACCH), the base transceiver station retransmitting them to the base station controller, there are required in the base station controller only means for determining the cell B' on the basis of, firstly, the measured distances and, secondly, the received power measurements. These means can be very simple, for example a table of correspondences, determined by trial and error or by calculation, for example.

The FIG. 3 diagram can also be used to illustrate this example, with the information $I_1$ representing the distance measurements and the information $I_2$ representing the measured values of the power received by the mobile station on one or more control frequencies.

When the new cell B' has been determined, the base station controller device then commands a change of cell, from whichever of the cells $B_1$ and $B_2$ via which the mobile was accessing the preceding cell to the other of those cells $B_1$ and $B_2$, and with a frequency (or a set of frequencies if frequency hopping is used) corresponding to the new cell.

As already mentioned, the timing advance information to be used in the new cell can then be determined in a manner that is known in itself.

Figure 4:
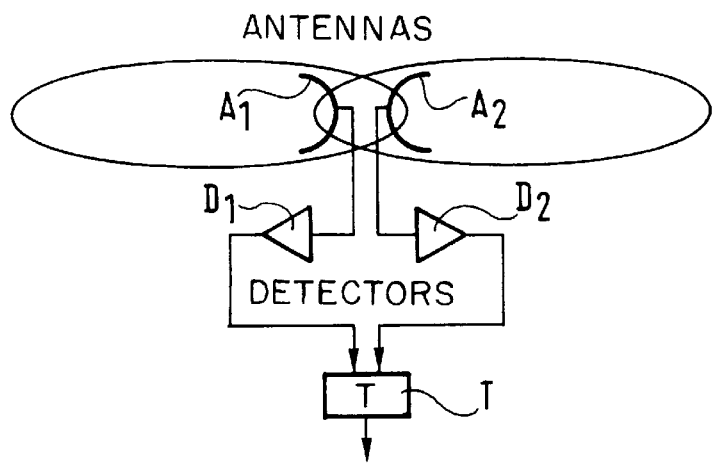
FIG. 4 shows another embodiment of means of the invention for resolving the indeterminacy associated with the direction of a mobile station.

In another example, to determine the new cell B', the base station controller combines a detected increase in distance corresponding to the mobile station leaving the preceding cell with the result of measurement of the power received from the mobile station by the base transceiver station of the preceding cell on two receive antennas having coverage areas in opposite directions, such as the antennas $A_1$ and $A_2$ in FIG. 4, these power measurements being transmitted to the base station controller.

For example, if it is detected that the mobile has left the receiving cell, for example the cell B in FIG. 2, and that the power received by the lefthand antenna $A_1$ of the base transceiver station of the cell B is greater than the power received by the righthand antenna $A_2$, then it is deduced that the mobile station is now in the coverage area of the cell B' in FIG. 2.

In this example the base transceiver station of a cell with no control frequency includes, as shown in FIG. 4, in addition to the two antennas $A_1$ and $A_2$, two receive level detector means, the means $D_1$ detecting the level received at the antenna $A_1$ and the other means $D_2$ detecting the level received at the antenna $A_2$, together with processing means T for combining the signals received at each of the antennas $A_1$ and $A_2$ (for example, by retaining the stronger of the two or by summing the two), to extract the wanted information received from the mobile station by this base transceiver station.

In this embodiment, the power measurement results received from the mobile station via the antennas $A_1$ and $A_2$ of the preceding base transceiver station can be used to resolve the indeterminacy associated with the direction in which the mobile station is located relative to the base transceiver station of the preceding cell.

A system like the GSM system, for example, in which the power measurement results received from the mobile station by a base transceiver station are conventionally transmitted to the base station controller, requires only means for transmitting to this base station controller two measurement results (corresponding to the two antennas $A_1$ and $A_2$), rather than one result, and means for determining the best cell in accordance with, firstly, distance measurement and, secondly, received power measurements. These means can be very simple, for example a table of correspondences determined by trial and error or by calculation, for example.

The FIG. 3 diagram can also be used to illustrate means like these for determining the best cell, with the information $I_1$ representing distance measurements and the information $I_2$ representing receive powers at the antennas $A_1$ and $A_2$.

More generally, note that in a network other than the linear network shown in FIG. 2, more than two antennas with separate coverages would be provided.

Note also that although the preceding description has been given with particular reference, by way of example, to a system in which at least one cell does not have any control frequency and in which a cell of this kind is accessed via a cell having a control frequency received by the mobile station, the present invention is not limited to this example of application.

There is claimed:

1. A method of selecting a next cell for call handoff of a call already set up between a mobile station in a present cell and a present cell base transceiver station in the present cell, the method comprising:
   determining the distance of the mobile station from the present cell base transceiver station;
   when the distance reaches a predetermined threshold:
      determining, at the present cell base transceiver station, a first power level of the mobile station received at a first antenna of the present cell base transceiver station, the first antenna being oriented in a first direction,
      determining, at the present cell base transceiver station, a second power level of the mobile station received at a second antenna of the present cell base transceiver station, the second antenna being oriented in a second direction,
      selecting a cell adjacent to the present cell as the next cell for handoff based on the first and the second power levels, and on the first and the second directions.

2. A cellular mobile radio system including means for selecting the best cell to be accessed for a given position of a mobile station, said means including:

first means for determining the distance of the mobile station relative to the base transceiver station of a cell with which it is communicating by measuring the propagation time between the mobile station and the base transceiver station, second means for resolving the indeterminacy associated with the direction in which said mobile station is located relative to said base transceiver station, and third means for determining, from results provided by said first and second means, in which cell the mobile station is situated, this cell constituting said best cell, wherein said resolving of said indeterminacy is effective even when said base transceiver stations are not in synchronization;

wherein at least one cell has no control frequency; and wherein said system is accessed via cells with control frequencies received by the mobile station.

3. The system claimed in claim 2 wherein said second means include, in the case of a mobile station communicating with a cell at the time of a system access request:
   means for commanding a change of cell to another cell, and
   means for determining the distance of the mobile station relative to the base transceiver station of said other cell by measuring the propagation time between said mobile station and said other cell.

4. The system claimed in claim 2 wherein said second means include, in the case of a mobile station communicating with said system at the time of a call already set up, means for measuring the power received by said mobile station on one or more control frequencies.

5. The system claimed in claim 2 wherein said second means include, in the case of a mobile station communicating with a cell at the time of a call already set up, means for measuring the power received from the mobile station by the base transceiver station of said cell via antennas having separate radio coverage areas.

6. A base transceiver station for a cellular mobile radio system as claimed in claim 5 including antennas having separate radio coverage areas.

7. A base station controller device for a cellular mobile radio system as claimed in claim 1 wherein said third means are in said base station controller device.

8. A cellular mobile radio system comprising:
   a mobile station, a plurality of base transceiver stations associated with respective cells, at least some of said base transceiver stations having corresponding control frequencies, and a controller controlling said base transceiver stations;
   wherein, when said mobile station requires network access for a call:
      said mobile station transmits network access request information on one of said received control frequencies to said corresponding one of said plurality of base transceiver stations, said one of said plurality of base transceiver stations defining a first base transceiver station;
      based on a propagation delay of said network access request information sent to said first base transceiver station, said first base transceiver station determines a first relative distance from said first base transceiver station to said mobile station, and provides said first relative distance to said controller;
      when said first relative distance indicates that said mobile station is outside said respective cell of said first base transceiver station, said controller commands handover of said call to another of said plurality of base transceiver stations having a corresponding control frequency and defining a second base transceiver station;

in response to said command of said controller, said mobile station transmits information to said second base transceiver station;

based on a propagation delay of said information sent to said second base transceiver station, said second base transceiver station determines a second relative distance from said second base transceiver station to said mobile station, and provides said second relative distance to said controller; and said controller selects for said call one of said plurality of base transceiver stations defining a selected base transceiver station, based on said first and second relative distances, said associated cell of said selected base transceiver station defining a selected cell.

9. The cellular mobile radio system as set forth in claim 8, wherein said selected base transceiver station has no control frequency.

10. A method of selecting a next cell for call handoff of a call already set up between a mobile station in a present cell and a present cell base transceiver station in the present cell, the method comprising:

determining the distance of the mobile station from the present cell base transceiver station;

when the distance reaches a predetermined threshold:
determining, at the mobile station, a first power level of a received first control frequency transmitted from a first base transceiver station, determining, at the mobile station, a second power level of a received second control frequency transmitted from a second base transceiver station, and selecting, as the next cell for call handoff, one of a plurality of adjacent cells of the present cell, based on the first power level and the second power level, wherein said one of said plurality of adjacent cells has no control frequency.

11. The method of selecting as set forth in claim 10, wherein the selecting of the one of the adjacent cells is performed by:

identifying the relatively stronger signal, corresponding to the greater of the first and the second power levels, and selecting the one of the adjacent cells closer to the base transceiver station that transmitted the relatively stronger signal as the next cell for call handoff.

12. The method of selecting as set forth in claim 10, wherein the selecting of the one of the adjacent cells is performed by:

determining the first and the second power levels a plurality of times, when the first power level is increasing over time, selecting the one of the adjacent cells closer to the first base transceiver station as the next cell for call handoff, and when the second power level is increasing over time, selecting the one of the adjacent cells closer to the second base transceiver station as the next cell for call handoff.

* * * * *